United States Patent
Reddy et al.

(10) Patent No.: US 7,166,160 B2
(45) Date of Patent: Jan. 23, 2007

(54) BIODEGRADABLE CEMENT RETARDER COMPOSITIONS AND METHODS OF CEMENTING IN A SUBTERRANEAN FORMATION

(75) Inventors: B. Raghava Reddy, Duncan, OK (US); Bryan K. Waugh, Comanche, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 10/420,447

(22) Filed: Apr. 22, 2003

(65) Prior Publication Data

US 2004/0211339 A1   Oct. 28, 2004

(51) Int. Cl.
C04B 24/12 (2006.01)
C04B 24/04 (2006.01)
E21B 33/138 (2006.01)

(52) U.S. Cl. ............ 106/808; 106/691; 106/727; 166/293; 405/267; 507/129

(58) Field of Classification Search ............. 106/691, 106/727, 808; 405/267; 507/129; 166/293
See application file for complete search history.

(56) References Cited

U.S. PATENT DOCUMENTS

| | | | |
|---|---|---|---|
| 3,359,225 A | 12/1967 | Weisend | 260/29.6 |
| 3,937,282 A | 2/1976 | Shyrock et al. | 106/89 |
| 4,028,125 A | 6/1977 | Martin | 106/89 |
| 4,557,763 A | 12/1985 | George et al. | 106/90 |
| 4,676,832 A | 6/1987 | Childs et al. | 106/90 |
| 5,049,288 A | 9/1991 | Brothers et al. | 252/8.551 |
| 5,220,960 A | 6/1993 | Totten et al. | 166/293 |
| 5,281,270 A | 1/1994 | Totten et al. | 106/687 |
| 5,284,512 A | 2/1994 | Koskan et al. | 106/416 |
| 5,346,550 A | 9/1994 | Kunzi et al. | 106/709 |
| 5,368,642 A | 11/1994 | Rodrigues et al. | 106/727 |
| 5,417,759 A | 5/1995 | Huddleston | 106/727 |
| 5,421,879 A | 6/1995 | Rodrigues | 106/727 |
| 5,447,198 A | 9/1995 | Kunzi et al. | 166/293 |
| 5,472,051 A | 12/1995 | Brothers | 166/293 |
| 5,536,311 A | 7/1996 | Rodrigues | 106/724 |
| 5,569,324 A | 10/1996 | Totten et al. | 106/696 |
| 5,571,318 A | 11/1996 | Griffith et al. | 106/725 |
| 5,672,203 A | 9/1997 | Chatterji et al. | 106/808 |
| 5,871,577 A | 2/1999 | Chatterji et al. | 106/808 |
| 5,876,623 A | 3/1999 | Tang et al. | 252/180 |
| 5,900,053 A | 5/1999 | Brothers et al. | 106/678 |
| 5,908,885 A | 6/1999 | Sikes et al. | 524/5 |
| 6,054,553 A | 4/2000 | Groth et al. | 528/335 |
| 6,133,347 A | 10/2000 | Vickers, Jr. et al. | 524/8 |
| 6,136,950 A | 10/2000 | Vickers, Jr. et al. | 528/363 |
| 6,143,069 A | 11/2000 | Brothers et al. | 106/678 |
| 6,227,294 B1 | 5/2001 | Chatterji et al. | 166/293 |
| 6,273,191 B1 | 8/2001 | Reddy et al. | 166/293 |
| 6,332,921 B1 | 12/2001 | Brothers et al. | 106/692 |
| 6,419,016 B1 | 7/2002 | Reddy | 166/293 |
| 6,454,004 B1 | 9/2002 | Reddy et al. | 166/293 |
| 6,488,763 B1 | 12/2002 | Brothers et al. | 106/692 |
| 6,630,021 B1 * | 10/2003 | Reddy et al. | 106/809 |
| 2003/0230407 A1 * | 12/2003 | Vijn et al. | 166/292 |

FOREIGN PATENT DOCUMENTS

| | | |
|---|---|---|
| DE | 100 17 133 A1 | 10/2001 |
| EP | 1 193 229 A2 | 4/2002 |
| EP | 1 394 353 A2 | 3/2004 |
| JP | 07-172888 A * | 7/1995 |
| JP | 10 036156 A | 2/1998 |
| WO | WO 00/00536 | 1/2000 |

OTHER PUBLICATIONS

Halliburton brochure entitled "CFR-2 Cement Friction Reducer—Dispersant" dated 1999, no month.
Halliburton brochure entitled "CFR-3 Cement Friction Reducer Dispersant"—Dated 1998, no month.
Halliburton brochure entitled "D-AIR 3000 and D-AIR 3000L Defoamers"—Dated 1999, no month.
Halliburton brochure entitled "Thermalock™ Cement For Corrosive $CO_2$—Environments" dated 1999, no month.
DONLAR BioPolymers technical bulletin entitled "DONLAR® Higher Molecular Weight Polymers" dated Apr. 24, 1998.
DONLAR BioPolymers technical bulletin entitled "DONLAR® Low Molecular Weight Polymers" dated Apr. 24, 1998.

* cited by examiner

Primary Examiner—Anthony J. Green
(74) Attorney, Agent, or Firm—Craig W. Roddy; Baker Botts L.L.P.

(57) ABSTRACT

The present invention is directed to hydraulic cement compositions comprising set-retarding additives and methods of retarding the set of a cement composition utilizing poly (amide) set-retarding additives and methods of cementing in subterranean zones utilizing a cement composition comprising a poly(amide) set-retarding additive.

24 Claims, 1 Drawing Sheet

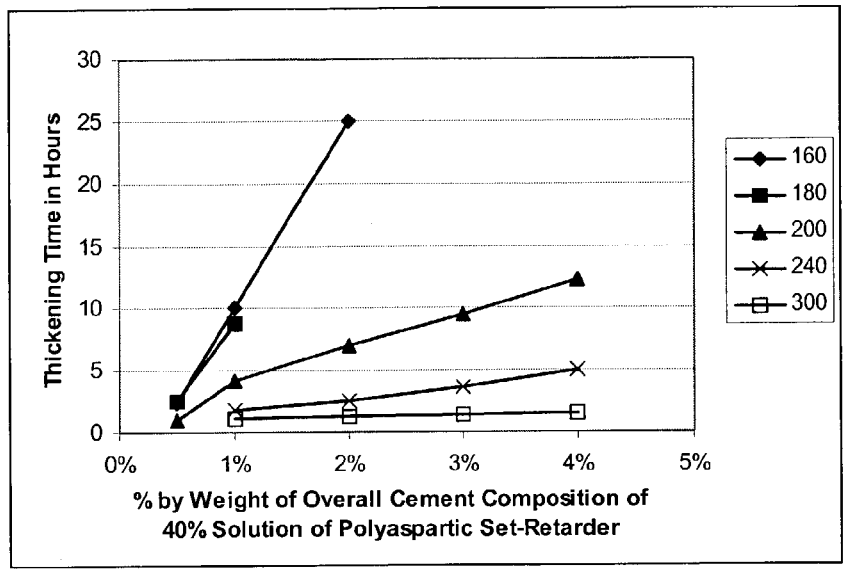
FIGURE 1: Change in thickening time as a function of the level of set retarder used
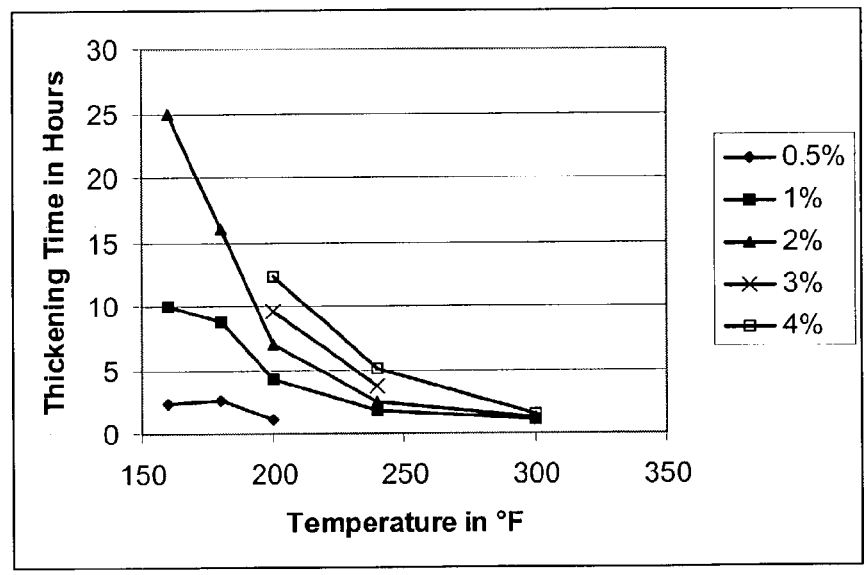
FIGURE 2: Change in thickening time as a function of the thickening temperature

BIODEGRADABLE CEMENT RETARDER COMPOSITIONS AND METHODS OF CEMENTING IN A SUBTERRANEAN FORMATION

FIELD OF THE INVENTION

The present invention relates to subterranean cementing operations, and more particularly, to set retarders for cement compositions and methods of using cement compositions comprising set retarders in subterranean cementing operations.

DESCRIPTION OF THE PRIOR ART

Hydraulic cement compositions are commonly utilized in subterranean operations, particularly subterranean well completion and remedial operations. For example, hydraulic cement compositions may be used in primary cementing operations whereby pipe strings such as casings and liners are cemented in well bores. In performing primary cementing, hydraulic cement compositions are pumped into the annular space between the wall of a well bore and the exterior surface of a pipe string disposed therein. The cement composition is permitted to set in the annular space, thereby forming an annular sheath of hardened, substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks or holes in pipe strings, and the like.

In subterranean zones, a wide range of temperatures may be encountered, presenting challenges to cement compositions used therein. For example, if the temperature of the subterranean formation is sufficiently high, the cement may set prematurely. To counteract this undesirable possibility, oftentimes the cement must be designed such that its setting time is delayed or retarded. That is, the thickening and setting characteristics of the cement composition must be altered such that the time it takes the cement composition to set is delayed for an amount of time sufficient to permit the cement composition to be pumped into the desired zone. To accomplish this, set-retarding additives are included in the cement compositions, inter alia, to extend the time the cement composition remains pumpable after it is mixed into a slurry. Set retarders are useful not only in delaying the set time of a cement composition exposed to high subterranean temperatures, but also to extend that time the cement remains pumpable after the cement slurry is created and before it is introduced to a subterranean zone.

Where a range of temperatures exists at different zones in a subterranean formation, different classes of cements or different set-retarding additives may be needed for cementing various zones within that formation. The use of more than one type of cement or set-retarding additive, for whatever purpose, requires multiple cleanings of the equipment and the storage and transportation of multiple components and is generally undesirable. Cements and additives that are suitable for use over a broad range of temperatures are therefore desirable.

While a variety of set-retarding additives have been developed and used successfully, they can, and often do, produce erratic results in cement compositions of varying content. For example, when the subterranean formation temperatures exceed about 250° F., the set time may become sensitive to minor changes in the amount of set retarder used. Thus, it becomes necessary to mix highly accurate amounts of retarder in a very precise manner, a difficult task to accomplish in the field where bulk quantities of cement and additives are mixed using a complex combination of equipment. Set retarding additives that exhibit predictable behavior are desirable In addition, many known set-retarding additives are synthetic polymers that are difficult to produce and are often not environmentally desirable because, inter alia, they are not biodegradable. In subterranean cementing, cement composition additives, such as set-retarding agents, are preferably biodegradable. When cement composition additives that are not biodegradable are utilized in subterranean applications, they may have an undesirable impact on the surrounding environment when accidentally or intentionally released therein.

SUMMARY OF THE INVENTION

The present invention provides improved set retarders for use in cement compositions and methods of using cement compositions comprising these set retarders in subterranean cementing applications.

One embodiment of the present invention provides a method of cementing comprising providing a cement composition comprising a hydraulic cement, water and a poly (amide) set-retarding additive, placing the cement into a subterranean zone, and allowing the cement to set.

Another embodiment of the present invention provides a method for retarding the set time of a cement composition comprising the steps of providing a cement composition comprising a hydraulic cement and water and adding a poly(amide) set-retarding additive thereto.

Still another embodiment of the present invention provides a cement composition comprising a hydraulic cement, water, and a poly(amide) set-retarding additive.

The objects, features, and advantages of the present invention will be readily apparent to those skilled in the art upon a reading of the description of preferred embodiments which follows.

BRIEF DESCRIPTION OF THE DRAWINGS

FIG. 1 is a graphical depiction of the change in thickening time as a function of the level of set retarder according to one embodiment of the present invention.

FIG. 2 is a graphical depiction of the change in thickening time as a function of the thickening temperature according to one embodiment of the present invention.

DESCRIPTION OF PREFERRED EMBODIMENTS

The present invention provides cement compositions comprising improved set-retarding additives and methods for using such compositions in subterranean cementing applications. While the cementing compositions of the present invention are useful in a variety of subterranean applications, they are particularly useful for subterranean well completion and remedial operations, including those in multi-lateral subterranean wells.

The cement compositions of the present invention are comprised of cement, water, and a biodegradable set-retarding additive. The cement compositions of the present invention are particularly useful for cementing subterranean formations exhibiting temperatures spanning a broad range.

The cement set-retarding additives of this invention generally comprise water-soluble poly(amides) with appended carboxylic groups. Suitable such poly(amides) may be homopolymers or copolymers, examples of which include but are not limited to polyaspartic acid and polyglutamic acid. Particularly suitable polyaspartic acids are sodium or ammonium salts of polyaspartic acids commercially available from Bayer Chemical Corporation, Pittsburgh, Pa. under the trade names "BAYPURE DS 100" and "BAYPURE DS 100/40%" and from Donlar Corporation, Bedford Park, Ill., under the tradename designations "DONLAR®A-2C," "DONLAR®A-3C," and "DONLAR®C-50D."

The set-retarding additives of the present invention preferably have a molecular weight in the range from about 500 to about 100,000, more preferably from about 1,000 to about 20,000 and most preferably from about 2,000 to about 5,000. Depending at least in part on the molecular weight of the set-retarding additive, it may act not only as a set retarder but also as a dispersant. For instance, as the molecular weight of a set-retarding additive of the present invention increases, it tends to act more as a retarding agent and less as a dispersant and vice versa. The molecular weight of the poly(amide) also has the ability to effect the fluid properties of the cement composition. For instance, generally speaking, if the molecular weight of the poly(amide) becomes too high, the cement slurry may take on undesirable, gel-like qualities. One of ordinary skill in the art with the benefit of this disclosure will be able to choose an appropriate molecular weight of the poly(amide) component of the set-retarding additives of the present invention for the subterranean cementing application at issue.

The set-retarding additive of the present invention may be used in liquid or solid form. By way of example and not of limitation, one type of suitable set-retarding additive of the present invention is a polyaspartic acid that has been dissolved in water in an amount of about 40% by weight of the resulting solution, i.e., 40% active. In a preferred embodiment, the aqueous polyaspartic acid solution is included in the cement composition in an amount in the range of from about 0.5% to about 7.5% by weight of the cement in the composition. One skilled in the art, with the benefit of this disclosure, will be able to determine the amount of the set retarder of the present invention needed for the cement composition and the desired application. Where the set retarder of the present invention is used in an aqueous form, it either may be added to the cement mix water, or injected into the slurry while it is pumped into the subterranean formation. Where the set retarder of the present invention is used in a solid form, it is generally dry blended with the cement along with the other dry components.

The set retarders of the present invention are suitable for use over a broad temperature range. For cementing operations involving subterranean temperatures from about 50° F. to about 250° F., a poly(amide) may be used as the sole set retarder in the cement composition. At temperatures above about 250° F. it may be necessary to add one or more high-temperature set retarders in addition to the poly(amide) set retarders of the present invention. Such high-temperature set retarders, when used in combination with set retarders that are effective at low temperatures, not only extend the set time but also may make the cement composition less sensitive to minor changes in retarder concentrations. Examples of suitable high-temperature set retarders include but not limited to, tartaric acid and its alkali and ammonium salts, gluconic acid and its alkali, alkaline earth and ammonium salts, gluconolactone, glucuronic acid, uronic acidate, and sodium pentaborate. One skilled in the art, with the benefit of this disclosure, will be able to determine the amount, if any, of any high-temperature set retarder needed for use in combination with the set retarders of the present invention. Generally, such additional set retarders are present in an amount sufficient to desirably effect the set time of a cement composition used at a temperature above about 250° F.

Any cement suitable for use in subterranean cementing operations may be used in the cement compositions of the present invention. A variety of hydraulic cements are suitable for use in the compositions and methods of the present invention including those comprised of calcium, aluminum, silicon, oxygen, and/or sulfur, which set and harden by reaction with water. Such hydraulic cements include, but are not limited to, Portland cements, ultrafine particle Portland cement, pozzolana cements, gypsum cements, high alumina content cements, silica cements, and high alkalinity cements. Portland cements suited for subterranean cementing are classified as Class A, C, H and G according to API Specification For Materials And Testing For Well Cements, API Specification 10, Fifth Edition, dated Jul. 1, 1990 of American Petroleum Institute. Another suitable cement is commercially available under the trade designation "THERMALOCK™" from Halliburton Energy Services in Duncan, Okla. and described in at least U.S. Pat. No. 6,488,763, herein incorporated by reference. The set retarders of the present invention are also suitable for use in low-density cements. Such low-density cements may be foamed cements or may be cements comprising another means to reduce their density such as hollow microspheres, low-density elastic beads, or other density-reducing additives known in the art.

The water utilized in the cement compositions of this invention can be fresh water, salt water (e.g., water containing one or more salts dissolved therein), brine (e.g., saturated salt water produced from subterranean formations), or seawater. Generally, the water can be from any source provided that it does not contain an excess of compounds that adversely affect other components in the cement composition or the performance of the cement composition relative to the subterranean conditions to which it may be subject. The water is combined with the dry cement in an amount sufficient to create a pumpable slurry. In a preferred embodiment, the amount of water used ranges from about 30% to about 150% by weight of the dry cement.

As will be recognized by those skilled in the art, the cement compositions of the present invention can also include additional additives such as salts, dispersants, defoaming agents, fluid loss additives, suspension aids, weighting materials, and the like. While a variety of dispersing agents known to those skilled in the art may be used in accordance with the present invention, one preferred dispersing agent is a water-soluble polymer prepared by the caustic-catalyzed condensation of formaldehyde with acetone wherein the polymer contains sodium sulfite groups. Such a preferred dispersing agent is commercially available under the trade designation "CFR-3™" from Halliburton Energy Services of Duncan, Okla. Another suitable dispersant is commercially available under the trade designation "CFR-2™," also from Halliburton Energy Services in Duncan, Okla. If used, preferably, the dispersing agent is present in amounts up to about 3% by weight of the cement composition, more preferably in amounts up to about 1.5% by weight of the cement composition and most preferably in amounts up to about 1% by weight of the cement composition. While a variety of defoaming agents known to those skilled in the art may be used in accordance with the present invention, a preferred defoaming agent is commercially available under the trade designation "D-AIR 3000™" from Halliburton Energy Services of Duncan, Okla. Preferably, the defoaming agent is present in amounts up to about 2% by weight of the cement composition, more preferably in an amount sufficient to keep the cement composition from foaming to an undesirable extent. For example, a suitable range in one embodiment is up to about 1% by weight of the cement composition and most preferably in amounts up to about 0.5% by weight of the cement composition.

When cement compositions are utilized to conduct primary, remedial and other cementing operations in subterranean zones, the compositions must remain pumpable for a sufficient period of time to permit placement into the subterranean zone. The set-retarding additives of the present invention, accordingly, should be included in the cement composition of this invention in an amount sufficient to delay or retard the setting of the composition for the a time period sufficient to place the composition in the desired location given the characteristics of the subterranean formation. The thickening and set times of cement compositions are strongly dependent upon temperature and pressure. To obtain satisfactory results in the chosen application, a predetermined quantity of the set-retarding additive of the present invention required to provide the necessary pumping time at the temperatures and pressures expected to be encountered should be included in the cement composition. That quantity can be determined by performing thickening time tests of the type described in the API Specification 10, Fifth Edition, dated Jul. 1, 1990 of American Petroleum Institute. In one embodiment of the present invention, an aqueous solution of one of the above-described set-retarding additives which contains about forty percent polymer by weight of solution is combined with a cement slurry in an amount whereby the active polymer is present in the resulting set retarded cement composition in an amount from about 0.1% to about 7.5% by weight of dry cement in the composition. This type of composition would be particularly suitable for a subterranean application having a temperature from about 50° F. to about 450° F. As noted above, at temperatures above about 250° F., an additional high-temperature set retarder may be used to further extend the cement set time.

The methods of the present invention for cementing a subterranean zone penetrated by a well bore generally comprise the steps of preparing a cement composition comprising the set-retarding additive of the present invention, placing the cement composition into a subterranean zone, and allowing the cement composition to set therein.

To facilitate a better understanding of the present invention, the following examples of some of the preferred embodiments are given. In no way should such examples be read to limit the scope of the invention.

EXAMPLES

A set-retarding solution of the present invention, in the form of a 40% active solution of sodium salt of polyaspartic acid, was added to the fresh water followed by a blend of Class H cement, and 35% by weight of the total cement composition of silica flour to make a slurry having a density of 16.4 pounds per gallon. The slurry was prepared and the set time determined according to API Specification 10. The amounts of the retarder solution added to the cement slurry was varied to study the effects of retarder concentration on set time. The five levels of the set retarder solution tested included: 0.5%, 1.0%, 2.0%, 3.0%, and 4.0% by weight of the cement in the composition. The cement slurries were then allowed to set at various temperatures and their thickening times recorded, the results are shown in Table 1, below:

TABLE 1

Thickening times over various temperatures and percentages of 40% solution of a sodium salt polyaspartic acid set retarder.

| Percentage set retarder by weight of cement | 160° F. | 180° F. | 200° F. | 240° F. | 260° F. |
| --- | --- | --- | --- | --- | --- |
| 0.5% | 2 hours, 23 minutes | 2 hours, 33 minutes | 1 hour, 2 minutes | no data | no data |
| 1.0% | 10 hours | 8 hours, 45 minutes | 4 hours, 15 minutes | 1 hour, 46 minutes | 1 hour, 6 minutes |
| 2.0% | over 25 hours | no data | 7 hours | 2 hours, 30 minutes | 1 hour, 17 minutes |
| 3.0% | no data | no data | 9 hours, 33 minutes | 3 hours, 40 minutes | no data |
| 4.0% | no data | no data | 12 hours, 20 minutes | 5 hours, 3 minutes | 1 hour, 30 minutes |

Plotting the data set forth in Table 1, above, reveals that the set time of the set retarded cements of the present invention is essentially linearly related to the amount of set retarder used. This linear relation is shown in FIG. 1.

Considering that data in another way, and plotting temperature versus the concentration of set retarder revels that the trends tend to be sigmoid-shaped and fit power equations, reflecting relatively predictable behavior. This relation is shown in FIG. 2.

Cement set retardation was also tested at 300° F. with a set-retarding composition comprising 4% by weight of a 40% active solution of sodium salt of polyaspartic acid of the cement composition and various percentage levels of a sodium tartarate solution. The tartaric acid solution utilized was 40% percent active. The results of those sets are set forth in Table 2, below:

TABLE 2

Thickening times at 300° F. using a set-retarding composition comprising a sodium salt of polyaspartic acid and tartaric acid.

| Percentage tartaric acid solution by weight of cement | Thickening Time |
| --- | --- |
| 0.0% | 1 hour, 31 minutes |
| 0.5% | 2 hours, 40 minutes |

TABLE 2-continued

Thickening times at 300° F. using a set-retarding composition comprising a sodium salt of polyaspartic acid and tartaric acid.

| Percentage tartaric acid solution by weight of cement | Thickening Time |
|---|---|
| 1.0% | 5 hours |
| 2.0% | 11 hours, 30 minutes |

Cement set retardation was also tested at 350° F. with a set-retarding composition comprising 4% by weight of a 40% active solution of sodium salt of polyaspartic acid of the cement composition and various percentage levels of a tartaric acid solution. The tartaric acid solution used was 40% active. The results of those sets are set forth in Table 3, below:

TABLE 3

Thickening times at 350° F. using a set-retarding composition comprising sodium salt of polyaspartic acid and tartaric acid.

| Percentage tartaric acid solution by weight of cement | Thickening Time |
|---|---|
| 1.0% | 2 hours, 30 minutes |
| 2.0% | 2 hours, 50 minutes |
| 3.0% | 5 hours |
| 4.0% | 5 hours |

Cement set retardation was also tested at 350° F. with a set-retarding composition comprising either 4% or 6% by weight of a 40% active solution of sodium salt of polyaspartic acid of the cement composition and various percentage levels of a tartaric acid solution. The tartaric acid solution utilized was also 40% active. The results of those sets are set forth in Table 4, below:

TABLE 3

Thickening times at 350° F. and 400° F. using a set-retarding composition comprising sodium salt of polyaspartic acid and tartaric acid.

| Temperature ° F. | % Sodium salt of polyaspartic acid by weight of cement | % tartaric acid solution by weight of cement | Thickening Time |
|---|---|---|---|
| 350 | 6% | 3% | 5 hours, 10 min |
| 400 | 4% | 4% | 2 hours, 20 minutes |

Therefore, the present invention is well adapted to carry out the objects and attain the ends and advantages mentioned as well as those that are inherent therein. While numerous change may be made by those skilled in the art, such changes are encompassed within the spirit and scope of this invention as defined by the appended claims.

What is claimed is:

1. A method of cementing in a subterranean formation comprising the steps of:
   providing a cement composition comprising a hydraulic cement, water, and a poly(amide) set-retarding additive, wherein the poly(amide) has a molecular weight from about 500 to about 3,000;
   placing the cement composition into the subterranean formation, wherein the subterranean formation comprises a temperature of above about 90° F. to about 250° F.; and
   allowing the cement composition to set therein.

2. The method of claim 1 wherein the hydraulic cement is a calcium phosphate cement.

3. The method of claim 1 wherein the hydraulic cement is a low-density cement.

4. The method of claim 1 wherein the cement composition further comprises at least one of the following: a dispersant, a fluid loss additive, or a weighting agent.

5. The method of claim 1 wherein the poly(amide) is present in an amount from about 0.1% to about 6% by weight of dry cement.

6. The method of claim 1 wherein the poly(amide) is polyaspartic acid, a salt of polyaspartic acid, polyglutamic acid, or a salt of polyglutamic acid.

7. The method of claim 1 wherein the cement composition further comprises at least one of the following: tartaric acid, an alkali salt of tartaric acid, an ammonium salt of tartaric acid, gluconic acid, an alkali salt of gluconic acid, an alkaline earth salt of gluconic acid, an ammonium salt of gluconic acid, gluconolactone, glucuronic acid, uronic acidate, sodium pentaborate, or a combination thereof.

8. The method of claim 1 wherein the cement composition comprises a Class H cement, silica powder, water, and a poly(amide).

9. A method for retarding the set time of a cement composition that comprises a hydraulic cement comprising calcium and aluminum comprising the step of adding a poly(amide) to the cement composition wherein the poly (amide) has a molecular weight from about 500 to about 3,000 and retards the setting of the cement composition at temperatures above about 90° F. to about 250° F.

10. The method of claim 9 wherein the hydraulic cement is a calcium phosphate cement.

11. The method of claim 9 wherein the hydraulic cement is a low-density cement.

12. The method of claim 9 wherein the cement composition further comprises at least one of the following: a dispersant, a fluid loss additive, or a weighting agent.

13. The method of claim 9 wherein the poly(amide) is present in an amount from about 0.1% to about 6% by weight of dry cement.

14. The method of claim 9 wherein the poly(amide) is polyaspartic acid, a salt of polyaspartic acid, polyglutamic acid, or a salt of polyglutamic acid.

15. The method of claim 9 wherein the cement composition further comprises at least one of the following: tartaric acid, an alkali salt of tartaric acid, an ammonium salt of tartaric acid, gluconic acid, an alkali salt of gluconic acid, an alkaline earth salt of gluconic acid, an ammonium salt of gluconic acid, gluconolactone, glucuronic acid, uronic acidate, sodium pentaborate, or a combination thereof.

16. The method of claim 9 wherein the cement composition comprises a Class H cement, silica powder, water, and a poly(amide).

17. A cement composition comprising a hydraulic cement, water, a water-soluble polymer, and a poly(amide);
   wherein the water-soluble polymer comprises sulfite groups; and
   wherein the poly(amide) has a molecular weight from about 500 to about 3,000 and is capable of retarding the setting of the cement composition when the cement composition is subject to temperatures above about 90° F. to about 250° F.

18. The cement composition of claim 17 wherein the hydraulic cement is a calcium phosphate cement.

19. The cement composition of claim 17 wherein the hydraulic cement is a low-density cement.

20. The cement composition of claim 17 wherein the cement composition further comprises at least one of the following: a dispersant, a fluid loss additive, or a weighting agent.

21. The cement composition of claim 17 wherein the poly(amide) is present in an amount from about 0.1% to about 6% by weight of dry cement.

22. The cement composition of claim 17 wherein the poly(amide) is polyaspartic acid, a salt of polyaspartic acid, polyglutamic acid, or a salt of polyglutamic acid.

23. The cement composition of claim 17 wherein the cement composition further comprises at least one of the following: tartaric acid, an alkali salt of tartaric acid, an ammonium salt of tartaric acid, gluconic acid, an alkali salt of gluconic acid, an alkaline earth salt of gluconic acid, an ammonium salt of gluconic acid, gluconolactone, glucuronic acid, uronic acidate, sodium pentaborate, or a combination thereof.

24. The cement composition of claim 17 wherein the cement composition comprises a Class H cement, silica powder, water, and a poly(amide).

* * * * *